(12) United States Patent
Chong et al.

(10) Patent No.: US 8,054,807 B2
(45) Date of Patent: Nov. 8, 2011

(54) HANDOVER METHOD FOR MOBILE WiMAX NETWORK BASED ON HUMAN MOBILITY BEHAVIOR

(75) Inventors: Song Chong, Daejeon (KR); Sachin Lal Shrestha, Daejeon (KR); Nah Oak Song, Daejeon (KR); Hwang Soo Lee, Gyeonggi-do (KR); Young Ki Kim, Daejeon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 497 days.

(21) Appl. No.: 12/331,537

(22) Filed: Dec. 10, 2008

(65) Prior Publication Data
US 2010/0144353 A1    Jun. 10, 2010

(51) Int. Cl.
*H04Q 7/24* (2006.01)
*H04Q 7/00* (2006.01)

(52) U.S. Cl. ........ 370/331; 370/328; 370/338; 455/436; 455/442

(58) Field of Classification Search .......... 370/313–341; 455/434–452.2
See application file for complete search history.

(56) References Cited

U.S. PATENT DOCUMENTS

| | | | |
|---|---|---|---|
| 2008/0198808 A1* | 8/2008 | Hwang et al. | 370/331 |
| 2010/0208690 A1* | 8/2010 | Guo et al. | 370/331 |
| 2011/0003595 A1* | 1/2011 | Shan | 455/436 |

* cited by examiner

*Primary Examiner* — Afsar M. Qureshi
(74) *Attorney, Agent, or Firm* — Bacon & Thomas, PLLC (57) ABSTRACT

A Handover method in a mobile WiMAX network includes sending a list of target BSs for possible HO acquired by an MSS to a serving BS; providing, at the serving BS, a HO request to the target BSs in the list along with an unique identifier identifying the MSS to collect association responses from the target BSs; providing, at the serving BS, the association responses along with the unique identifier to the MSS so that the MSS performs scanning and ranging processes; performing resource reservation for possible HO at the target BSs; setting up service flows at a target BS selected among the target BSs; bi-casting data from the serving BS to the MS and the selected target BS before the connection break with the serving BS; and performing, at the MSS, an initializing procedure to connect with the selected target BS as a new serving BS.

7 Claims, 8 Drawing Sheets

HANDOVER METHOD FOR MOBILE WIMAX NETWORK BASED ON HUMAN MOBILITY BEHAVIOR

FIELD OF THE INVENTION

The present invention relates to a mobile communication system, more specifically to a fast hard handover method based on a human mobility behavior for reducing handover latency for facilitating seamless handover for real time traffic in a Mobile WiMAX network.

BACKGROUND OF THE INVENTION

Mobile WiMAX IEEE 802.16e standard has added mobility support to its predecessor IEEE 802.16d. Handover (HO) of a Mobile Subscriber Station (MSS) between WiMAX Base Stations (BSs) takes place in a defined sequence of events as shown in the FIG. 1.

Figure 1:
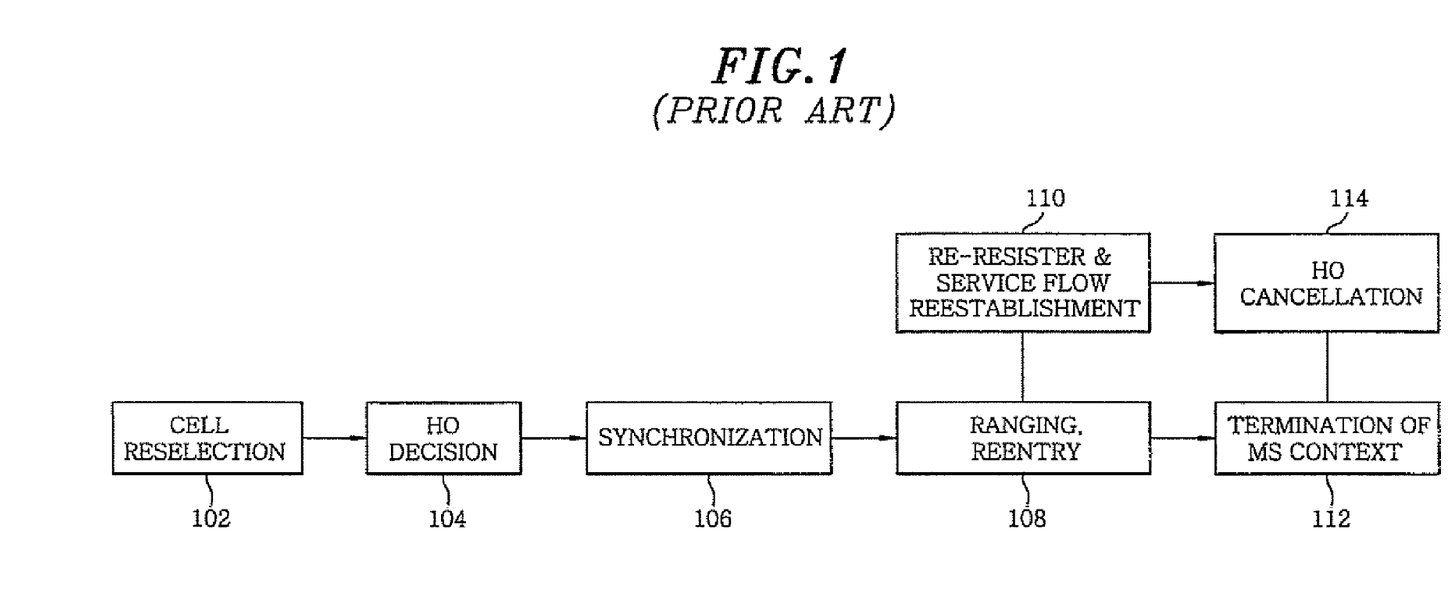
FIG. 1 illustrates a typical HO process of IEEE IEEE 802.16e standard.

A cell reselection process 102 is a periodic process in which MOB_NRB-ADV of mobile neighborhood advertisement messages from a serving BS are collected in a MMS. The MOB_NRB-ADV message contains parameters of neighboring BSs to synchronize in case of possible HO. Once the MSS constructs a virtual network topology using MOB_NRB-ADV message, the MSS starts scanning the neighbor BSs in pre-assigned period designated by the serving BS using MOB_SCN-REQ and MOB_SCN-RSP messages The MSS provides a set of target BSs in the MOB_SCN-REQ message to the serving BS, and the serving BS then negotiates with all or selected target BSs based on triggering events set in UCD (uplink channel descriptor) and DCD (downlink channel descriptor) messages. Through backbone network the serving BS collects rendezvous time allocated by each target BS. This report is sent to the MSS using MOB_SCN-RSP message. At the rendezvous time or scanning time, the MSS scans either one or more target BSs However, the MSS may scan all the BSs in the list of the MOB_SCN-RSP or few target BSs based on triggering event.

During scanning, after a target BS's ID is confirmed, the MSS tries to synchronize with its downlink transmission 106 and estimate the quality of the PHY channel. The synchronization happens if association or an optional initial ranging is done during scanning, else it is done only after HO decision 104.

The function of the association is to enable the MSS to acquire and record ranging parameters and service availability information for the purpose of proper selection of a target BS to serve the HO and/or expediting a potential future HO to the target BS. Recorded ranging parameters of an associated BS may be further used for setting initial ranging values in future ranging events during actual HO. The association parameters (e.g., PHY offsets, CIDs, etc.) stored in the MSS are obtained from RNG-RSP of ranging response message of the target BS.

In the process of the HO decision and initiation 104, the HO begins with the decision that may originate either at the MSS, the serving BS or on the network. The HO proceeds with the notification of either MOB_MSHO-REQ or MOB_BSHO-REQ A response messages MOB_BSHO-RSP holds a list of the targets BS that is compiled by the serving BS based on the possible MSS performance computed in the network. The serving BS negotiates with the possible targets BSs in the list given in the MOB_MSHO-REQ message The message MOB_BSHO-RSP contains the rendezvous time and opportunity for contention free coordinated ranging processing with the possible target BSs. During the rendezvous time either obtained from the association table in the MSS or in the MOB_MSHO-RSP message, the MSS synchronizes with the downlink transmission of possible target BSs 106.

Once the MSS synchronizes with the downlink transmission of a target BS, the MSS scans the target BS for UL-MAP that includes either a contention- or non-contention-based MSS Initial Ranging opportunity In either case, the MSS sends RNG-REQ message that may include MSS MAC Address or HO_ID assigned in MOB_BSHO-REQ or MOB_BSHO-RSP messages The RNG-REQ message contains serving BSID and Ranging Purpose Indication. On successful Ranging, the target BS assigns to the MSS Basic CID and Primary CID in the RNG-RSP management message 108. The reception of the RNG-RSP reception indicates successful network re-entry whereby the MSS sends a Bandwidth Request header to the serving BS.

Capability negotiation and registration process establishes security, authorization, authentication and service flow remapping. For security functionality, the MSS issues HMAC/CMAC Tuple as the last message item in the RNG-REQ management message using the Authorization Key and Key Sequence Number derived for use on the target BS. The remapping of service flow can be given to the MSS by the target BS in a REG-RSP provided that the target BS has obtained a backbone message containing network to build 110.

After the handover request/response handshake has been completed, the MSS begins the actual HO. At some stage during the HO process, the MSS terminates service with the serving BS. This is accomplished by sending a MOB_HO-IND message with the HO-IND_type=0b00 value indicating serving BS release 112. The serving BS starts the Resource retain timer from value Resource_Retain_Time. The serving BS retains the connections, MAC state machine and PDUs associated with the MSS for service continuation until the expiration of the timer.

HO cancellation 114 may happen in two different ways. First, when an MSS transmits MOB_HO-IND message with HO cancel option (HO_IND_type=0b01), and second, a drop where an MSS stops communicating with its serving BS before the normal HO sequence (outlined in Cell Selection and Termination) with the serving BS has been completed. In either case, the MSS can send HO_IND_type=0b01, and if the serving BS receives the message before the Resource Retain Timer has expired, the MSS and serving BS immediately starts normal operation.

However, in the existing Mobile WiMAX system with the HO standard briefly discussed above, there are a number of logical changes introduced in the HO algorithm. The current standard facilitates seamless HO but does not execute HO in timely fashion as required by IEEE 802.16m. More specifically, during the HO process, the serving BS directs the target BSs to reserve resources for likely HO of an MSS to one of the target BSs, but as the MSS decides on a particular target BS, rest of the target BSs are requested by the serving BS to release the resources Reservation of the resources is a costly affair when considering some of the bottleneck resources in a BS. Such resources may be bandwidth, code, etc.

Therefore, there exists a need to achieve the IEEE 802.16m standard requirements for the HO.

SUMMARY OF THE INVENTION

It is, therefore, an object of the present invention is to provide an efficient, less time consuming HO of an MSS between sectors of same cell or between different cells.

Another object is to provide neighbor BS discovery with a combined aid of learned network and neighborhood advertisement management message that effectively decreases the overhead of management messages and increased resource utilization as a target BS is known with higher degree of accuracy way before HO initiation.

In accordance with the invention, there is provided a handover (HO) method for mobile WiMAX network including:

sending a list of target BSs for possible HO acquired by an MSS (mobile subscriber station) to a serving BS;

providing, at the serving BS (base station), a HO request to the target BSs in the list along with an unique identifier to collect association responses from the target BSs, wherein the unique identifier uniquely identify the MSS;

providing, at the serving BS, the association responses along with the unique identifier to the MSS so that the MSS performs scanning and ranging processes using the unique identifier;

performing resource reservation for the MSS for possible HO at the target BSs;

setting up service flows at a target BS selected among the target BSs;

bicasting data from the serving BS to the MS and the selected target BS before the connection break with the serving BS;

performing, at the MSS, an initializing procedure to connect with the selected target BS as a new serving BS.

According to another aspect of the present invention, the target BSs are acquired based on learned logical network pathway taken by the MSS and the learned logical network pathway is achieved using the pattern of mobility behavior, which exploits the repetitive and predictive way of travel normally undertaken by a user of the MSS.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

References will now be made in detail to the embodiments of the present invention, examples of which are illustration in the accompanying drawing.

Present invention embodies an MSS with learning ability and equips the MSS to use its acquired knowledge for resource efficient HO by choosing the most likely target BS. A target BS is suggested even before the need for HO; a phenomenon similar to predicting the future, in this case, predicting the possible path the MSS will take. Possibilities of the movement of the MSS are confined to the roadways. Users of the MSS have tendency to follow same path given a pair of source and destination. The users due to socio-cultural aspects can be associated with several consistently reoccurring source and destination points when they travel. For instance, people travel for various purposes: attending school, going to offices, meeting a friend, going to a favorite shopping malls, etc. Irrespective of age, demography and culture, the movement behavior of the users is homogeneous and ubiquitous.

Most of people traveling from one point to another take a shortest route. For a given pair of source and destination, the shortest route is always fixed and thus the MSS takes the same path repeatedly. A metropolitan city can be divided into dense urban, urban, suburban and free land/rural. Dense urban areas are densely populated and larger numbers of BSs are deployed compared to the rest of the city areas. So the choices of target BSs can be at least 2. However, in urban or suburban area, possible target BSs is at most 2. Therefore, in the latter case where the long distance travel is more prevalent, same target BSs are chosen with a high probability each time the MSS passes by.

Figure 2A:
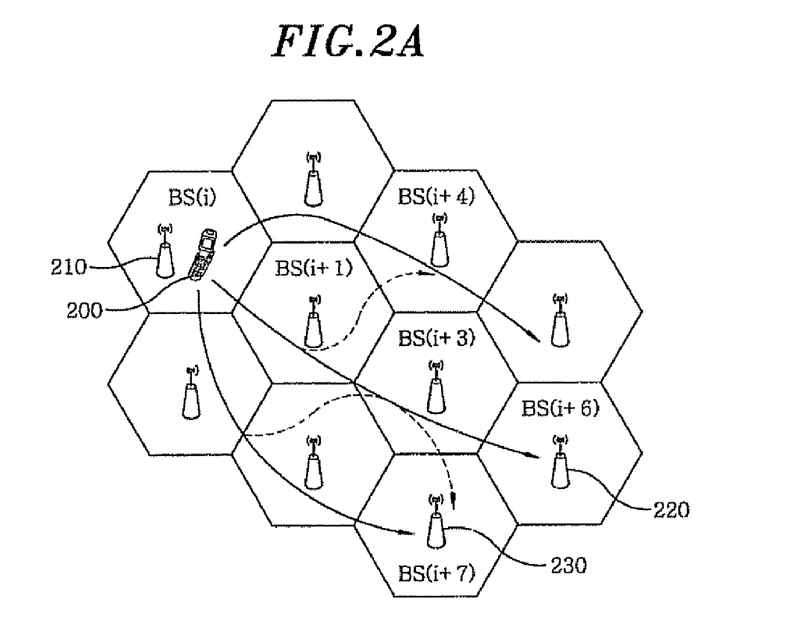
FIG. 2A shows a possible BS sequencing when an MSS travels.
Figure 2B:
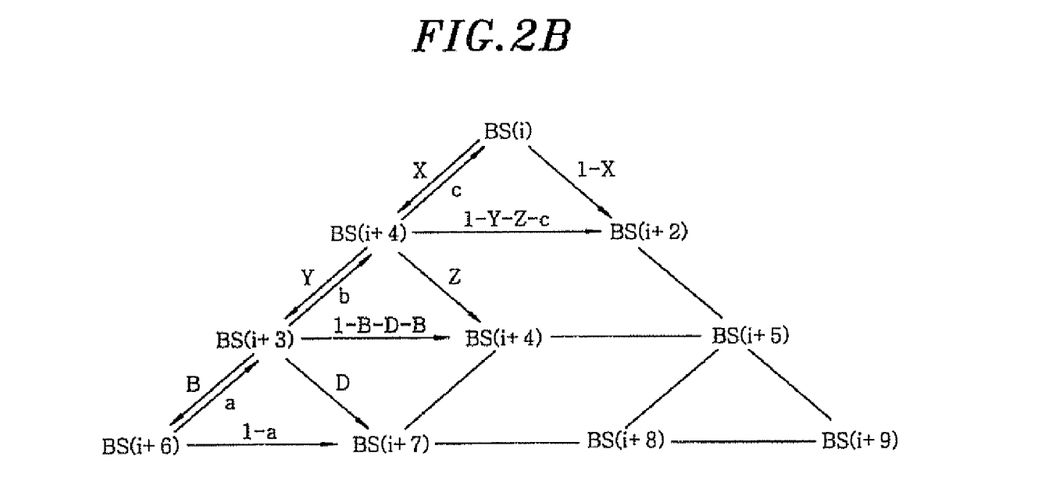
FIG. 2B shows a logical BS sequence map in the form of a trellis with each edge with continuous computed probability based on the selection of the BS each time HO decision is made.

FIG. 2A shows possible BS sequencing when a MSS 200 travels, where solid lines indicate a normal and frequent BS sequence while dashed lines indicate a rare BS sequence as a result of detours taken by the MSS, again depending on external factors such as traffic congestion, etc. FIG. 2B shows a logical BS sequence map in the form a trellis with each edge with continuous computed probability based on the selection of the BS each time HO decision is made.

As noted above, the target BSs selection in the present invention is based on previously learned logical network pathway taken by the MSS 200. The MSS 200 maintains a pathway table having a list of possible target BSs tracked and collected by the MSS during the travel.

As the MSS 200 re-enters the network, the MSS provides the list of target BSs to a serving BS.

The next HO procedure is scanning followed by actual HO, which will be described with reference FIG. 3.

Figure 3A:
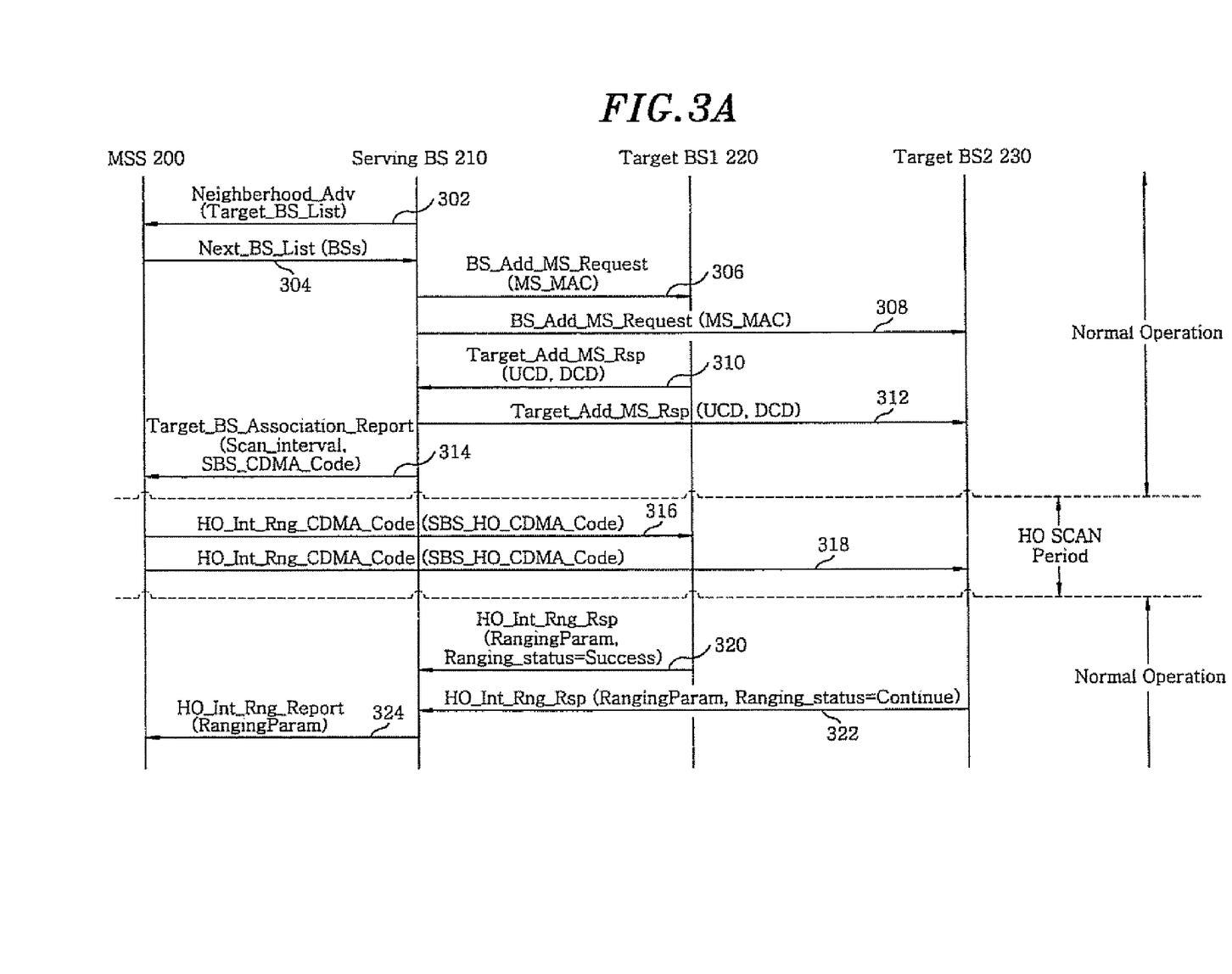
FIGS. 3A, 3B and 3C are a sequence diagram for HO procedure between two BSs in accordance with an embodiment of the present invention.
Figure 3B:
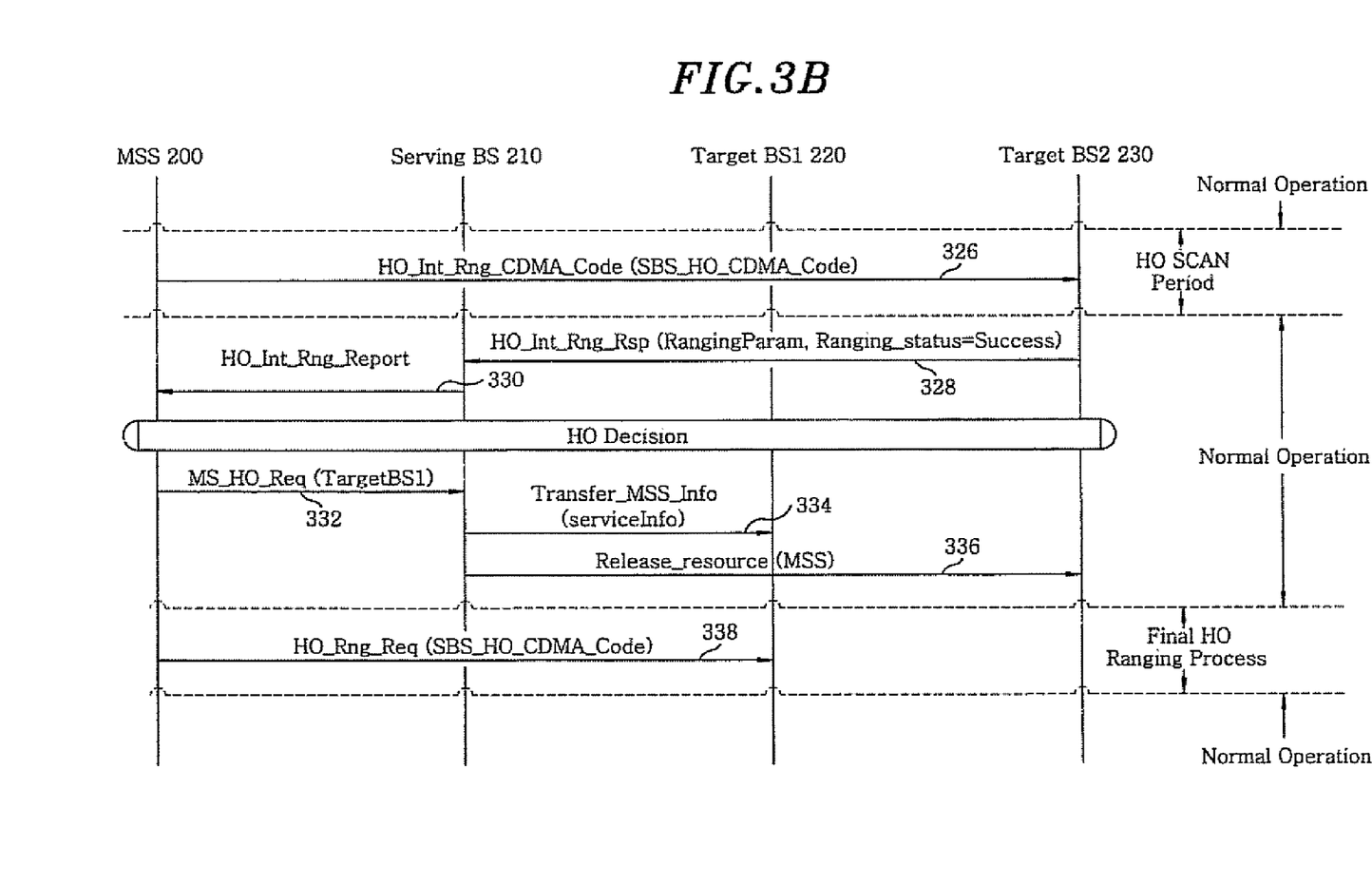
Figure 3C:
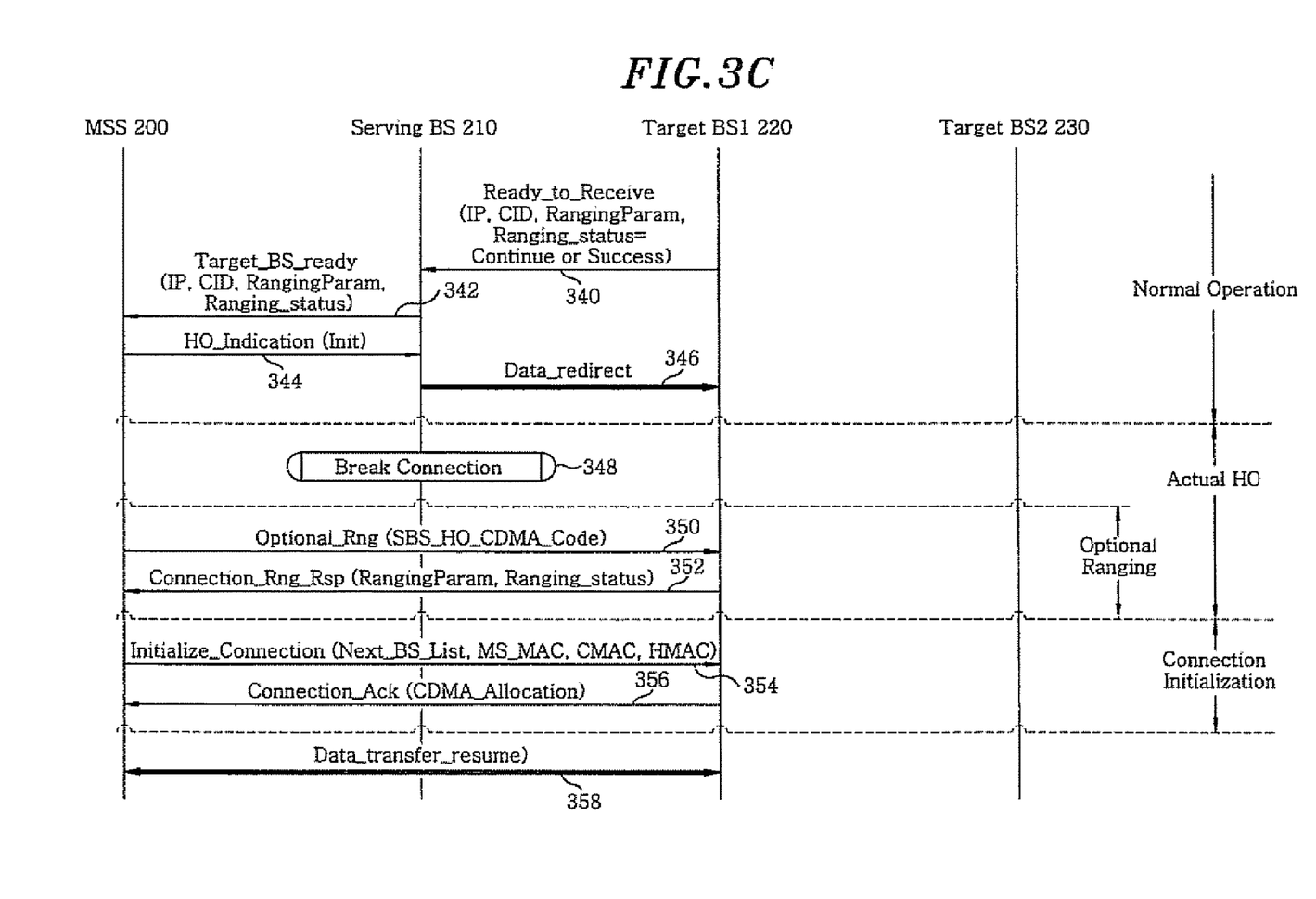

FIGS. 3A, 3B and 3C are a sequence diagram for HO procedure between two BSs in accordance with an embodiment of the present invention.

First of all, the serving BS 210 send Neighborhood_Adv (Target_BS_List) message to the MSS 200 at step 302.

As described above, the MSS 200 collects the target BSs, e.g., 220 and 230 based on the acquired knowledge and the list of the target BSs 220 and 230 is sent on Next_BS_List (BSs) message to a serving BS 210 at step 304.

The serving BS 210 sends BS_Add_MS_request (MS_MAC) through a backhaul network (not shown) to the target BSs 220 and 230 in the list obtained in Next_BS_List message at step 306. This message contains MSS MAC address. Each of the target BSs 220 and 230 uses the MAC address to identify any future communication with the MSS. Along with the MAC address of the MSS 200, the serving BS 210 sends to the target BSs 220 and 230 SBS_HO_CDMA_Code that uniquely identifies the MSS 200.

The target BSs 220 and 230 reply with TargetBS_Add_MS_Rsp (UCD, DCD) messages to the serving BS 210 at steps 310 and 312.

The serving BS 210 collects the response messages from the target BSs 220 and 230 and sends then to the MSS 200 Target_BS_Association_Report with scan_interval and SBS_HO_CDMA_Code at step 314. The scan_interval is the rendezvous time provided by the target BSs where contentions free scanning and optional association are possible, which is known in the art; therefore, detailed description therefor will be omitted.

The SBS_HO_CDMA_Code issued by the serving BS 210 is used for the purpose of HO related message transfer. The MSS 200 uses the SBS_HO_CDMA_Code to start an initial ranging and actual HO with the target BSs 220 and 230. The use of the CDMA code dramatically reduces the airtime overhead. The MSS 200 stores the scanning time periods along with the code.

Upon the arrival of scanning time interval, the MSS 200 sends to the target BSs 220 and 230 HO_Init_Rng_CDMA_Code message that in fact is the CDMA code of SBS_HO_CDMA_Code that has been assigned by the serving BS 220 and 230 at steps 316 and 318.

HO_Init_Rng_Rsp (RangingParam, Ranging_status) messages are sent to the serving BS 210 by the target BSs 220 and 230 via the backhaul network at steps 320 and 322.

At steps 324 and 330, the serving BS 210, in response thereto, sends to the MSS 200 HO_Init_Rng_Report message with ranging parameters from the target BSs 220 and 230. One of the ranging parameters is the Ranging_status. During HO Scan Period, the MSS 200 can send the CDMA code to either one or several target BSs at step 326.

When the target BSs 220 and 230 successfully receive the HO code and successfully allocate resources for the MSS for possible HO, the target BSs 220 and 230 send Ranging_status as 'successful' else the state is 'unsuccessful' as in steps 322 and 328.

The scan process and thus the initial ranging process repeat periodically, and for those unsuccessful scan responses, the MSS 200 sends the CDMA code again to the target BSs 220 and 230 having the status 'unsuccessful', and the MSS 200 may receive the status 'successful' from the target BSs 220 and 230 by the repetition.

As described, the serving BS 210 communicates with the target BSs 220 and 230 via the backhaul network to collect the ranging parameters, and sends the collected ranging parameters to the MSS 200. The collected ranging parameters are stored in the MSS 200.

Hereinafter, description will be made for a post-HO procedure that involves actual HO procedures in accordance with the embodiment of the present invention.

The MSS 200 scans for signal strength of the serving BS 210 and that of the target BSs 220 and 230. One of the target BSs is chosen as a new serving BS, e.g., the BS 220 to serve the HO based on the signal strength. After that, the MSS 200 sends MS_HO_REQ signal to the serving BS 210 with the target BS's ID as parameter at step 332.

The serving BS 210 migrates a MSS related service flow information to the chosen target BS 220 at step 334. Further, the Serving BS 210 is responsible to notify other target BS(s) 230 to release resources set aside in anticipation of possible HO through Release_resource message with a MSS MAC as parameter at step 336.

Thereafter, at step 338, the MSS 200 sends a HO_Rng_Req (SS_HO_CDMA_Code) request for obtaining an update on the ranging parameter of the chosen target BS 220. The normal scan interval is used for the purpose which is signified by 'Final HO Ranging Process' The HO_Rng_Req is again the HO CDMA code assigned by the serving BS 210 at the beginning of the HO procedure.

Upon successful creation of MAC CS layer serving flow parameters and reception of SBS_HO_CDMA_Code from the MSS 200, the chosen target BS 220 sends Ready_to_Receiver message to the serving BS 210 via backhaul with MAC layer service flow parameters such as Connection ID (CID), ranging parameters, and higher layer parameter such as MAC or IP address (for managed MSS) at step 340. This message also has Ranging_status parameter that represents 'continue' or 'success' and is used for same purpose as used in HO_init_Rng_Rsp message.

At step 342, the serving BS 210 sends Target_BS_ready message to the MSS 200 with all the parameters obtained from the chosen target BS 220.

Once the MSS 200 receives the Target_BS_Ready message, the MSS 200 replies the serving BS 210 with HO_Indication message at step 344. Till this point the MSS 200 has been connected to the serving BS 210 in a normal operation phase. However, when the serving BS 210 receives the HO_Indication message, the serving BS 210 redirects all the service flow traffic to the chosen target BS 220 and breaks the connection with the MSS 200, at steps 346 and 348, which indicates the initiation of actual HO.

The MSS 200 immediately starts connection procedure with the chosen target BS 220 after sending the HO_Indication message. Based on the Ranging_status received in the Target_BS_Ready message, the MSS 200 can either send send Optional_Rngmessage based on Ranging_status value being 'Success' or 'Continue' at step 350, or Initialize_Connection (Next_BS, MS_MAC, CMAC, HMAC) message at step 354.

The Optional_Rng message is just a code SBS_HO_CDMA_Code that tells the chosen target BS 220 that the MSS 200 attempting to connect to it is not successful in synchronizing to the downlink transmission and subsequently the uplink transmission as well.

Such condition, though rare, may be prevalent in high speed user case where previously obtained ranging parameters are no more valid due to time laps or extensive distance traveled in a short time.

In either case the chosen target BS 220 identifies such MSS 200 that have already been disconnected with its serving BS 210 and facilitates a fast ranging response Connection_Rng_Rsp message so that the actual HO time period is under 100 msec, a requirement of IEEE 802.16m standard at step 352. In a normal case, the MSS 200 initiates connection with the chosen target BS 220 via Initialize_Connection message, and as a response, the chosen target BS 220, which becomes now the new serving BS, sends Connection_Ack (CDMA_Allocation) message with which the MSS 200 starts normal operation and resumes the service flows at steps 356 and 358.

The security sublayer of Mobile WiMAX MAC layer functionality is assumed to take place based on the related art and is out of the scope of this patent. In present embodiment, security related processes like authentication and authorization takes place via the backhaul network between the serving and the target BSs before or during the actual HO process starts.

Figure 4:
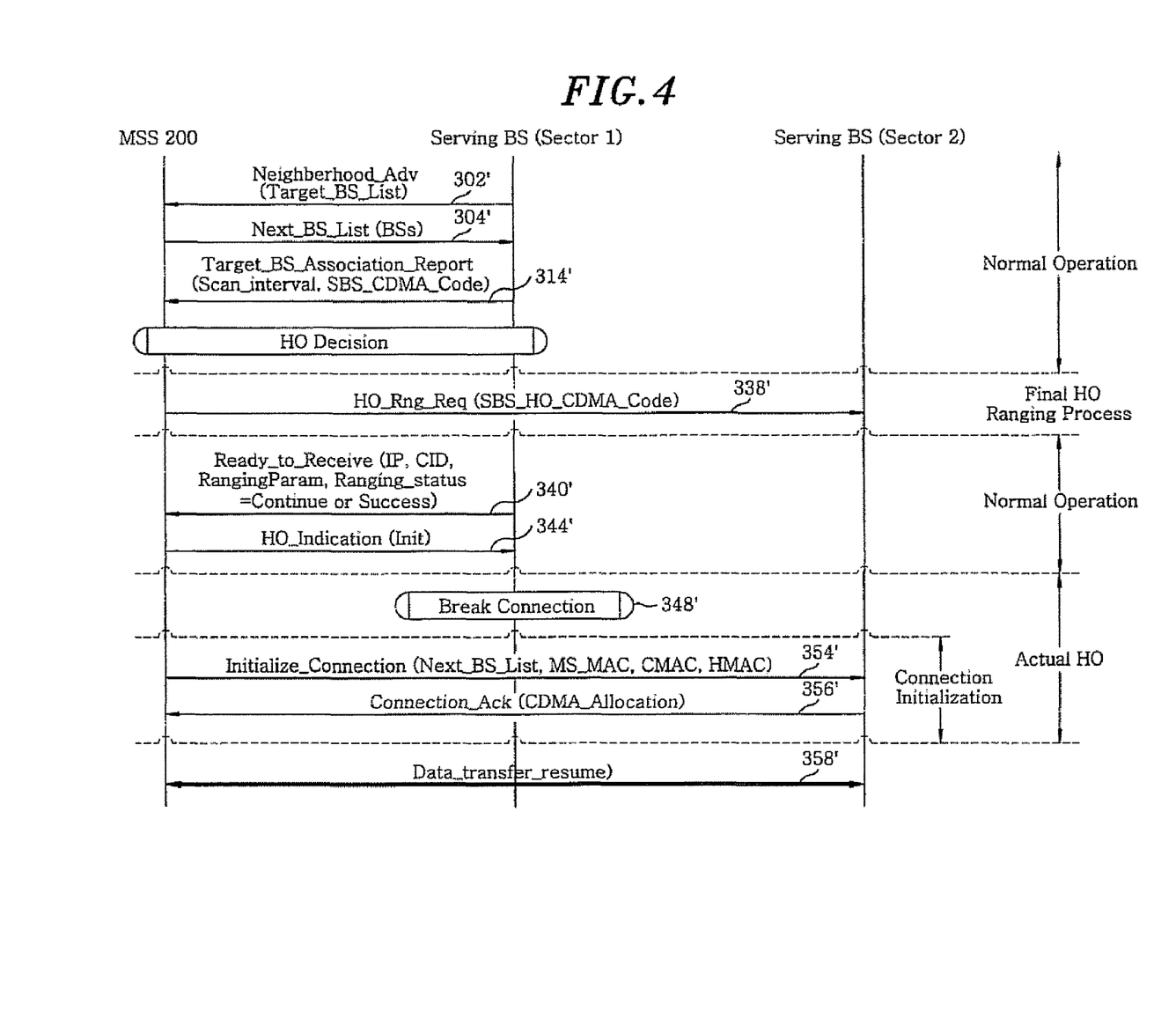
FIG. 4 is a sequence diagram of HO procedure between two different sectors in accordance with another embodiment of the present invention.

The HO procedure between two different BSs has been described with reference to FIGS. 3A, 3B and 3C; however, there may be another HO procedure between two different sectors (sector 1 and sector 2) of same serving BS 210 as shown in FIG. 4. In FIG. 4, similar reference numerals with apostrophe are used to represent the similar steps illustrated in FIGS. 3A, 3B and 3C.

In FIG. 4, assuming that the sector 1 is regarded as the serving BS 210 and the sector 2 is regarded as the target BS1 220, the HO procedure between two sectors is similar to that of between two BSs up to the Break Connection as in FIGS. 3A, 3B and 3C. The major difference is that the MSS 200 does not need for ranging and the serving BS 210 does not need to pass on service flow related information. After the connection break up with one sector, e.g., the sector 1, only Initial_Connection message is required to connect with the sector 2 and resume normal operation with the sector 2, at steps 354', 356' and 358'. Therefore, it will not be further described for the HO procedure between two different sector 1 and sector 2.

Figure 5:
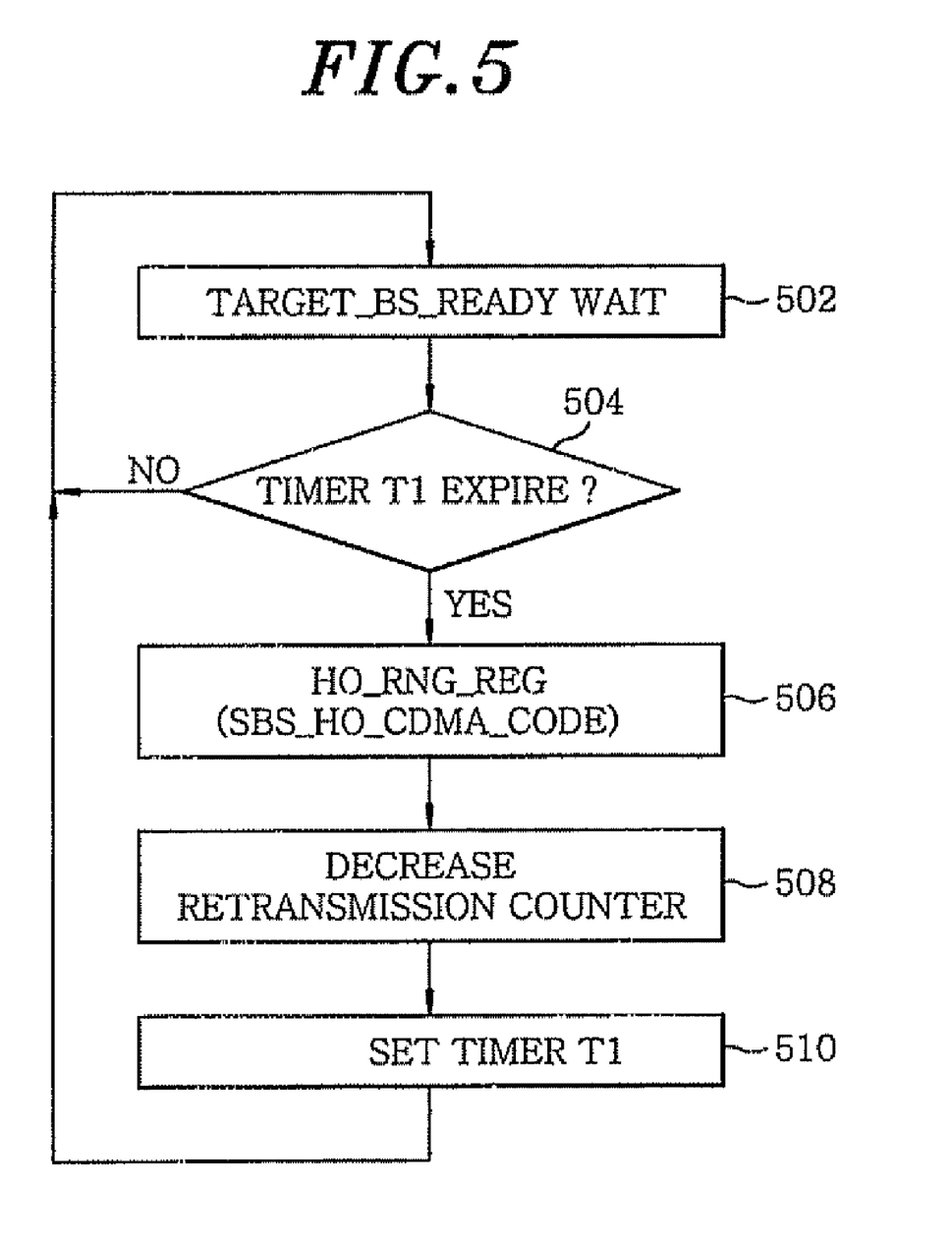
FIG. 5 is a flowchart providing the property of timer setting during ranging process in accordance with the embodiment of the present invention.

FIG. 5 is a flowchart providing the property of timer setting during the ranging process in accordance with the embodiment of the present invention.

Referring again to step 338 in FIGS. 3A, 3B and 3C, a timer T1 is set up by the MSS 200 when the HO_Rng_Reg(SBS_HO_CDMA_Code) message is sent to the chosen target BS 220.

After the MSS 200 sends the SBS_HO_CDMA_Code, it waits for Target_BS_Ready message till the timer T1 expires as in step 502.

If it is determined, at step 504, that the timer T1 expires. Once the timer T1 is expired and the retransmission counter is not zero, the MSS 200 resends the HO_Rng_Req message, at step 506, decreases the retransmission counter at step 508, and sets the timer T1 again, at step 510.

The retransmission counter and the timer T1 is settled to a maximum value and a given value during MSS initialization, respectively, which are out of scope of this present invention. The timer T1 and retransmission counter values must be set up such that, at the retransmission counter exhaustion, the MSS 200 can choose another target BS before losing connection with the serving BS 210.

Figure 6:
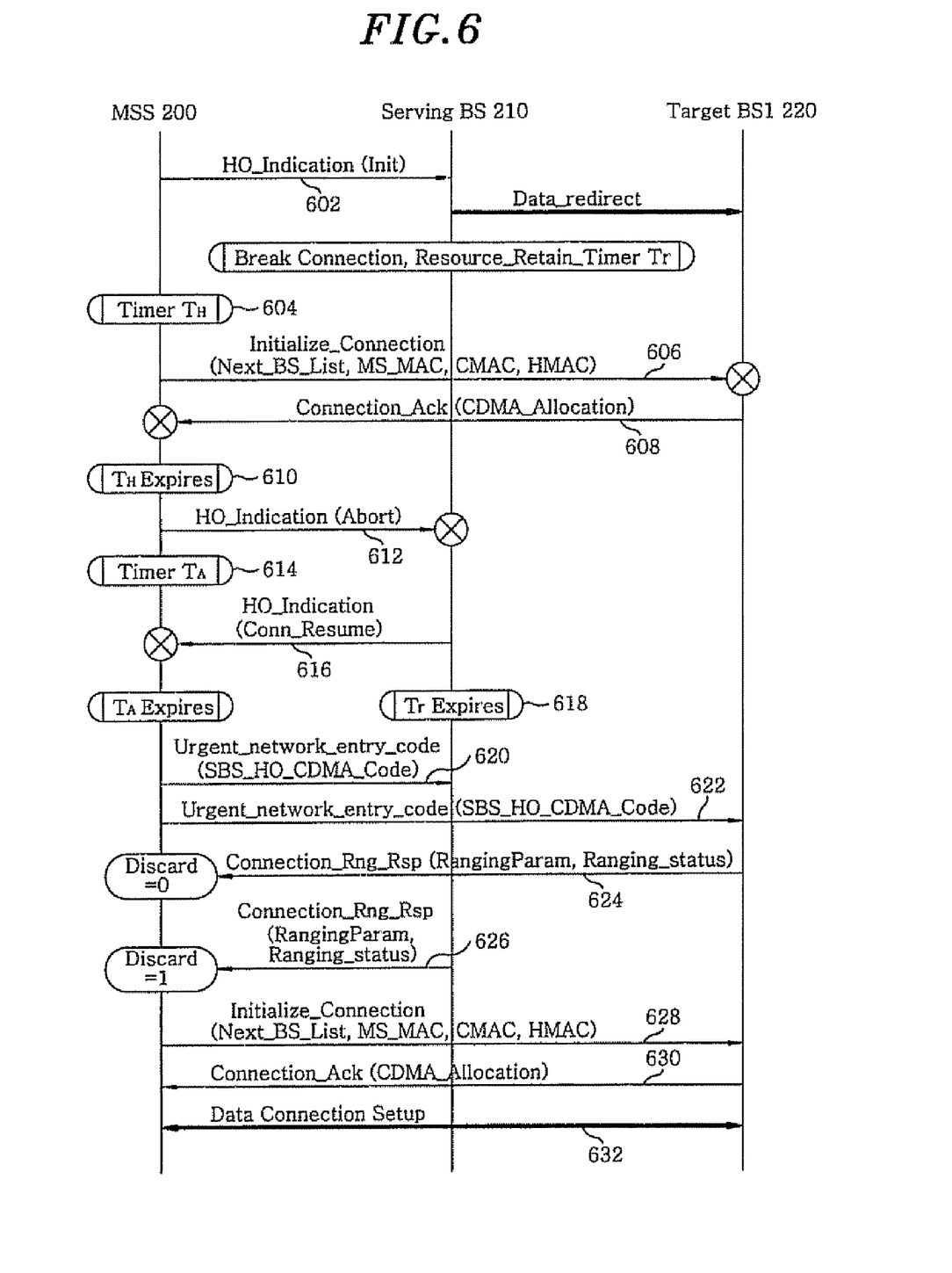
FIG. 6 is a sequence diagram for HO abort procedure of the present invention.

FIG. 6 is a sequence diagram for HO abort procedure of the present invention.

Under HO initiation, when the MSS 200 sends HO_Indication (Init) to the serving BS 210 at step 602, the MSS 200 starts a Timer TH and sends Initialize_Connection (Next_BS, MS_MAC, CMAC, HMAC) to the chosen target BS 220 at steps 604 and 606.

The chosen target BS 220 sends Connection_Ack (CDMA_Allocation) to the MSS 200 at step 608.

When the Timer TH expires, at step 610, as the MSS 200 still unable to synchronize due to ranging parameters invalidity; in such a case, the MSS 200 sends HO_Indication to the serving BS 210 with status='Abort' at step 612 and starts another Timer TA at step 614.

The serving BS 210, provided that Timer Tr is not expired yet, responds to the Abort signal and replies with HO_Indication (Conn_Resume) message at step 616. Thereafter, the MSS 200 and the serving BS 210 resume a normal operation till the MSS 200 attempts yet another HO.

If Timers TA and Tr expires before receiving the Abort signal at step 618 or the MSS 200 is unable to receive HO_Indication (Conn_Resume) message, the re-connection with the serving BS 210 is no longer possible as MAC states are already deleted from the serving BS 210. In such a case, the MSS 200 sends an Urgent_network_entry_code with SBS_HO_CDMA_Code at steps 620 and 622 as used for normal initial ranging and during actual ranging. The message is sent to the serving BS 210 and the chosen target BS 220 that maintain the SBS_HO_CDMA_Code for 100 ms from the HO_indication (Init) message.

The MSS 200 can receive Connection_Rng_Rsp (RangingParam, Ranging_status) from either both or only one of the BSs. In either case, the MSS 200 acknowledges the first received reply of Connection_Rng_Rsp messages and discards the secondly received reply at steps 624 and 626.

Using the ranging parameters obtained in Connection_Rng_Rsp message, the MSS 200 re-enters the network with Initialize_Connection message as discussed in normal HO operation before at step 628.

The chosen target BS 220, which is now the new serving BS, sends Connection_Ack message with which MSS 200 starts normal operation and resumes the service flows at steps 630 and 632.

The relation between the HO governing timers can be summarized with following equations:

$$Tr \geq TH + TA$$

$$Tr \ll 100 \text{ ms} \qquad \text{[Equation]}$$

For a seamless HO during real time traffic exchange between the MSS and the network, Timer Tr must be chosen considerably less than 100 ms. This ensures a timely re-entry and normal operation resumption of the MSS when the MSS fails to HO to target BS and also loses connection with its serving BS.

While the invention has been shown and described with respect to the preferred embodiments, it will be understood by those skilled in the art that various changes and modifications may be made without departing from the scope of the invention as defined in the following claims.

What is claimed is:

1. Handover (HO) method for mobile WiMAX network comprising:
    sending a list of target BSs (base stations) for possible HO acquired by an MSS (mobile subscriber station) to a serving BS;
    providing, at the serving BS, a HO request to the target BSs in the list along with an unique identifier to collect association responses from the target BSs, wherein the unique identifier uniquely identify the MSS;
    providing, at the serving BS, the association responses along with the unique identifier to the MSS so that the MSS performs scanning and ranging processes using the unique identifier;
    performing resource reservation for the MSS for possible HO at the target BSs;
    setting up service flows at a target BS selected among the target BSs;
    bi-casting data from the serving BS to the MSS and the selected target BS before the connection break with the serving BS;
    performing, at the MSS, an initializing procedure to connect with the selected target BS as a new serving BS,
    wherein the serving BS provides rendezvous time together with the association responses to the MSS, during which the MSS scans the target BSs using the unique identifier.

2. The handover method of claim 1, wherein the target BSs are acquired based on learned logical network pathway taken by the MSS.

3. The handover method of claim 2, wherein the learned logical network pathway is achieved using the pattern of mobility behavior, which exploits the repetitive and predictive way of travel normally undertaken by a user of the MSS.

4. The handover method of claim 1, wherein the target BSs, upon successful receipt of the unique identifier, response ranging status of successful receipts of the unique identifier, and the serving BS then sends the successful receipts to the MSS.

5. The handover method of claim 1, further comprising performing an optional ranging after the connection breakage, the optional ranging being triggered based on unsuccessful attempt for the connection initialization.

6. The handover method of claim 1, wherein setting up the service flows comprises:
  performing a final ranging using the unique identifier to obtain an update on the ranging parameter of the target BS, wherein the target BS sends updated ranging parameter with IP address for managed MSS along with connection ID to the serving BS; and
  sending HO indication message from the MSS to the serving to trigger the connection between the serving BS and the MSS to break thereby redirecting traffic to the target BS from the serving BS.

7. The handover method of claim 1, wherein initializing connection comprising:
  sending initialization message from the MSS to the target BS; and
  sending acknowledge to the initialization message from the target BS to the MSS, thereby resuming normal operation between the MS and the selected target BS as the new serving BS.

* * * * *